United States Patent [19]
Chiou

[11] Patent Number: 6,162,746
[45] Date of Patent: Dec. 19, 2000

[54] HYBRID PROTECTIVE COMPOSITE

[75] Inventor: Minshon J. Chiou, Chesterfield, Va.

[73] Assignee: E. I. du Pont de Nemours and Company, Wilmington, Del.

[21] Appl. No.: 09/217,360

[22] Filed: Dec. 21, 1998

Related U.S. Application Data

[63] Continuation-in-part of application No. 09/162,591, Sep. 29, 1998.

[51] Int. Cl.[7] ........................................ F41H 5/04
[52] U.S. Cl. .............................. 442/134; 2/2.5; 428/911; 442/135; 442/241; 442/243
[58] Field of Search ................. 2/2.5; 428/911; 442/134, 135, 241, 243

[56] References Cited

U.S. PATENT DOCUMENTS 5,578,358  11/1996  Foy et al. ............................ 428/104

FOREIGN PATENT DOCUMENTS

| | | | |
|---|---|---|---|
| 7-292137 | 11/1995 | Japan ................................. | C08J 5/24 |
| 8-27633 | 1/1996 | Japan ................................. | D01F 6/74 |
| 9-72697 | 3/1997 | Japan ................................. | F41H 1/02 |
| 2198628 | 6/1988 | United Kingdom .............. | F41H 1/02 |
| 92/14608 | 9/1992 | WIPO ............................ | B32B 27/02 |
| 9300564 | 1/1993 | WIPO ............................ | F41H 5/04 |
| 9311290 | 6/1993 | WIPO ............................ | D03D 15/00 |
| 93/20400 | 10/1993 | WIPO ............................ | F41H 5/04 |
| 9414023 | 6/1994 | WIPO ............................ | F41H 5/04 |
| 9632621 | 10/1996 | WIPO ............................ | F41H 5/04 |
| 9749849 | 12/1997 | WIPO ............................ | D03D 15/00 |
| 9805917 | 2/1998 | WIPO ............................ | F41H 1/02 |
| 9817136 | 4/1998 | WIPO ............................ | A41H 1/02 |
| 9947880 | 9/1999 | WIPO ............................ | F41H 1/02 |

*Primary Examiner*—Terrel Morris
*Assistant Examiner*—Arti R. Singh

[57] ABSTRACT

A composite is disclosed which is resistant to knife and ice pick stab penetration and is made from a plurality of layers of woven polybenzoxazole or polybenzothiazole fibers, a plurality of ballistic layers, and a plurality of tightly-woven penetration resistant layers.

17 Claims, 1 Drawing Sheet

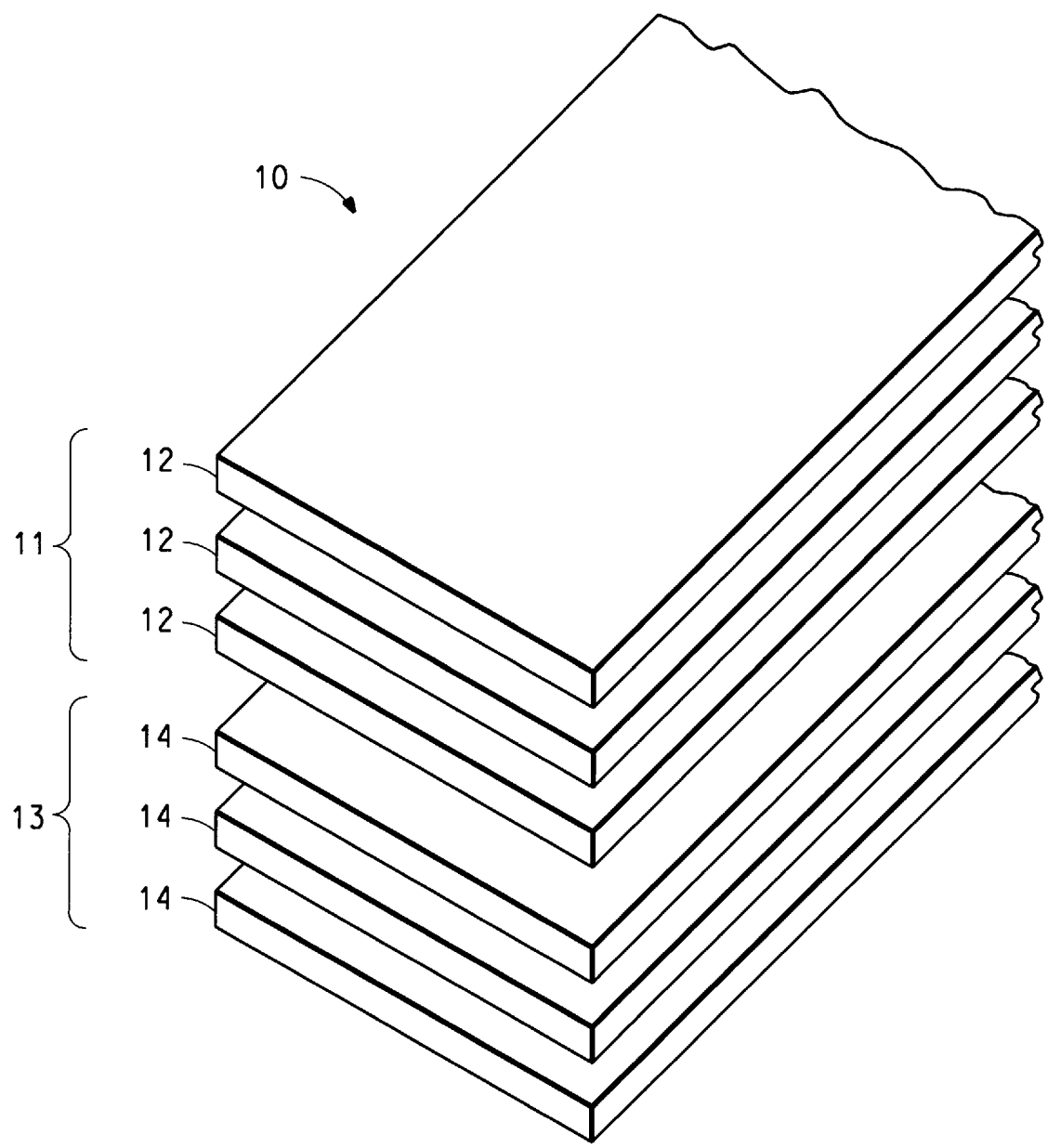
FIGURE

HYBRID PROTECTIVE COMPOSITE

This is a continuation-in-part of application Ser. No. 09/162,591 filed Sep. 29, 1998, now pending.

BACKGROUND OF THE INVENTION

1. Field of the Invention

This invention relates to protective composites in the field of knife and ice pick stab resistance which composites provide, on one hand, greater protection for a given weight; and, on the other hand, equivalent protection in a lighter weight, in comparison with other protective composites currently available. The composite of this invention is flexible and, also, provides good protection against ballistic threats.

2. Description of the Prior Art

International Publication WO 93/20400, published Oct. 14, 1993, discloses the use of polybenzoxazole and polybenzothiazole fibers in ballistic resistant articles.

U.S. Pat. No. 5,578,358, issued Nov. 26, 1996, on the application of Foy et al. discloses a penetration-resistant structure made from woven aramid yarns having particularly low linear density.

International Publication No. WO 93/00564, published Jan. 7, 1993, discloses ballistic structures using layers of fabric woven from high tenacity para-aramid yarn.

U.S. Pat. No. 5,472,769, issued Dec. 5, 1995, as an example of attempts to provide both puncture resistance and ballistic resistance, describes a combination of knitted aramid yarn layers and deflection layers of materials such as metal wire.

European Patent Application No. 670,466, published Sep. 6, 1995, describes a ballistic and stab-resistant system wherein the knife stab resistance is imparted by embedding chainmail in a polymer resin.

SUMMARY OF THE INVENTION

The present invention provides a protective composite structure with a plurality of layers of woven fabric comprising polybenzoxazole (PBO) or polybenzothiazole (PBT) fibers, a plurality of layers of tightly-woven penetration resistant fabric, and a plurality of layers of a network of fibers of ballistic protective fabric wherein the structure has an inner surface and an outer surface and the plurality of tightly-woven penetration resistant fabric layers is located nearer than the plurality of ballistic protective layers to the outer surface, that is, to the strike face for the penetration threat.

BRIEF DESCRIPTION OF THE DRAWINGS

The FIGURE shows an expanded perspective view of a composite of this invention.

DETAILED DESCRIPTION

Improvements in composites for knife and ice pick stab protection are continually sought, although often as a secondary quality after ballistic protection. Generally, knife and ice pick stab protection is required in garments worn by guards, police officers, and the like; and ballistic protection is, also, a desirable quality in such garments. Such garments must be as flexible as possible to ensure comfort sufficient that the garment will be readily worn.

While the kernel of the present invention resides in use of a particular combination of three different layers of materials to afford the desired protection results, each of the different layers do exhibit a primary utility in the combination.

The materials of this hybrid composite which are primarily effective for the knife stab resistance are polybenzoxazole or polybenzothiazole in fiber form in woven layers.

Polybenzoxazole and polybenzothiazole are generally, as described in the aforementioned WO 93/20400, incorporated herein by reference. Polybenzoxazole and polybenzothiazole are preferably made up of mers of the following structures:

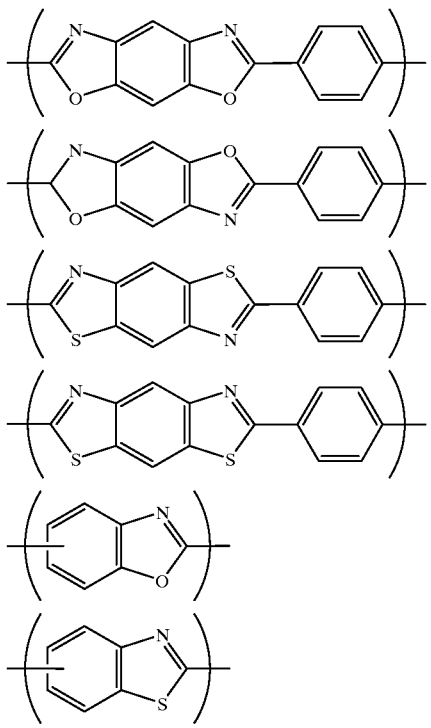

While the aromatic groups shown joined to the nitrogen atoms may be heterocyclic, they are preferably carbocyclic; and while they may be fused or unfused polycyclic systems, they are preferably single six-membered rings. While the group shown in the main chain of the bis-azoles is the preferred para-phenylene group, that group may be replaced by any divalent organic group which doesn't interfere with preparation of the polymer, or no group at all. For example, that group may be aliphatic up to twelve carbon atoms, tolylene, biphenylene, bis-phenylene ether, and the like.

The polybenzoxazole and polybenzothiazole used to make fibers of this invention should have at least 25 and preferably at least 100 mer units. Preparation of the polymers and spinning of those polymers is disclosed in the aforementioned International Publication WO 93/20400.

The polybenzoxazole and polybenzothiazole fibers are woven in any, generally-used, fabric configuration such as plain weave, crowfoot weave, basket weave, satin weave, and the like. Plain weave is preferred.

It is believed that fibers and yarns of any linear density will be effective to increase knife stab resistance in the present invention. The preferred linear density for individual fibers should be 0.3 to 17 dtex, and 0.5 to 3.5 dtex is most preferred. Yarns in the range of 100 to 3300 dtex are preferred with 220 to 1700 dtex being most preferred. Yarns with a linear density of greater than 3300 dtex are generally more difficult to produce and use efficiently and yarns with a linear density of less than 100 dtex are difficult to weave without damage to the yarn.

The materials of this hybrid composite which are primarily effective for the ice pick stab resistance and the ballistic protection can be, among other things, polyamide and polyolefin; and can, also, be polybenzoxazole and polybenzothiazole.

When the other polymer is polyamide, aramid is preferred. By "aramid" is meant a polyamide wherein at least 85% of the amide (—CO—NH—) linkages are attached directly to two aromatic rings. Suitable aramid fibers are described in Man-Made Fibers—Science and Technology, Volume 2, Section titled Fiber-Forming Aromatic Polyamides, page 297, W. Black et al., Interscience Publishers, 1968. Aramid fibers are, also, disclosed in U.S. Pat. Nos. 4,172,938; 3,869,429; 3,819,587; 3,673,143; 3,354,127; and 3,094,511.

Additives can be used with the aramid and it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride or the aramid.

The preferred aramid is a para-aramid and poly(p-phenylene terephthalamide)(PPD-T) is the preferred para-aramid. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether.

When the other polymer is polyolefin, polyethylene or polypropylene are preferred. By polyethylene is meant a predominantly linear polyethylene material of preferably more than one million molecular weight that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, propylene, and the like, or low molecular weight additives such as anti-oxidants, lubricants, ultraviolet screening agents, colorants and the like which are commonly incorporated. Such is commonly known as extended chain polyethylene (ECPE). Similarly, polypropylene is a predominantly linear polypropylene material of preferably more than one million molecular weight. High molecular weight linear polyolefin fibers are commercially available. Preparation of polyolefin fibers is discussed in U.S. Pat. No. 4,457,985.

As a general rule, flexible articles with ice pick penetration resistance are made using layers of fabric woven from yarn material with high tenacity and toughness; and the degree of ice pick penetration resistance is, among other things, a function of the linear density of the yarn and tightness of the weave. The lower the linear density of the yarn and the tighter the weave, the greater the ice pick penetration resistance.

"Fabric tightness factor" and "Cover factor" are names given to the density of the weave of a fabric. Cover factor is a calculated value relating to the geometry of the weave and indicating the percentage of the gross surface area of a fabric which is covered by yarns of the fabric. The equation used to calculate cover factor is as follows (from Weaving: Conversion of Yarns to Fabric, Lord and Mohamed, published by Merrow (1982), pages 141–143):

$d_w$=width of warp yarn in the fabric
$d_f$=width of fill yarn in the fabric
$P_w$=pitch of warp yarns (ends per unit length)
$P_f$ pitch of fill yearns $$C_w = \frac{d_w}{p_w} \qquad C_f = \frac{d_f}{p_f}$$

$$\text{Fabric Cover Factor} = C_{fab} = \frac{\text{total area obscured}}{\text{area enclosed}}$$

$$C_{fab} = \frac{(p_w - d_w)d_f + d_w p_f}{p_w p_f}$$
$$= (C_f + C_w - C_f C_w)$$

Depending on the kind of weave of a fabric, the maximum cover factor may be quite low even though the yarns of the fabric are situated close together. For that reason, a more useful indicator of weave tightness is called the "fabric tightness factor". The fabric tightness factor is a measure of the tightness of a fabric weave compared with the maximum weave tightness as a function of the cover factor.

$$\text{Fabric tightness factor} = \frac{\text{actual cover factor}}{\text{maximum cover factor}}$$

For example, the maximum cover factor which is possible for a plain weave fabric is 0.75; and a plain weave fabric with an actual cover factor of 0.68 will, therefore, have a fabric tightness factor of 0.91. The preferred weave for practice of this invention is plain weave.

Flexible ballistic articles are made using enough layers of networks of high tenacity and high toughness fiber material to be effective against a specified ballistic threat. The layers are present as a network of fibers in the form of a fabric and can include fibers of polyamides, polyolefins, or other fibers usually used for ballistic protection; and can include polybenzoxazole or polybenzothiazole fibers.

The fabric may be a woven, knitted, or non-woven structure; and, by non-woven, is meant unidirectional (if contained within a matrix resin), felted, and the like. By woven is meant any generally-used, fabric weave such as plain weave, crowfoot weave, basket weave, satin weave, and the like.

Fabrics for ballistic protection generally use yarns with relatively high linear densities and, when woven, have little regard for tightness of weave, except to avoid extremely tight weaves to avoid damage of yarn fibers resulting from the rigors of weaving.

The particular combination of this invention, utilizing special penetration resistant materials and ballistic materials, exhibits a good ballistic protection and an ice pick and knife penetration resistance which is much greater than would be expected from the sum of the penetration resistance of the individual elements of the combination. The individual elements in the combination of this invention have a particular element-to-element relationship.

The primarily knife penetration resistant layers of polybenzoxazole or polybenzothiazole fabric may be located anywhere in the composite of this invention. Generally, more than one layer of these fabrics will be required to afford the desired knife stab protection. Each layer of polybenzoxazole and polybenzothiazole generally has an areal density of 75 to 450 grams per square meter and, generally, 1 to 15 layers are used. The areal density of the layers depends greatly on the form of the network and on the kind and linear density of the fibers. Generally, however, the polybenzoxazole and polybenzothiazole fibers constitute from 10 to 90, and preferably 15 to 50, weight percent of the total composite.

The primarily ice pick stab resistant fabric layers are made from tightly-woven yarns of high strength fibers wherein the yarns generally have a linear density of less than 500 dtex and, preferably, the individual fibers in those yarns have a linear density of 0.2 to 2.5 dtex and more preferably 0.7 to 1.7 dtex. These layers can be made from polyamides, polyolefins, polybenzoxazoles, polybenzothiazole, or other fibers usually used for penetration resistance. The preferred material for these layers is para-aramid yarns. The preferred linear density for the yarns is 100 to 500 dtex and those yarns are preferably woven to a fabric tightness factor of 0.75 to 1.00 or, perhaps, higher, and, more preferably greater than 0.95. It is most preferred that the tightly woven fabric layers have a relationship between the yarn linear density (dtex) and the fabric tightness factor as follows:

Y>X 6.25 X $10^{-4}$+0.69 wherein, Y=fabric tightness factor and X=yarn linear density, as disclosed in the aforementioned U.S. Pat. No. 5,578,358.

The primarily ballistic protection layers can be woven or non-woven, and, if non-woven, can be unidirectional, uniweave, or the like. The layers can be made from polyamide, polyolefin, polybenzoxazoles, polybenzothiazole, or other polymers usually used for ballistic protection. The preferred construction for these ballistic layers is woven para-aramid yarns with a linear density of 50 to 3000 dtex. If woven, plain weave is preferred, although other weave types, such as basket weave, satin weave, or twill weave, can be used. The preferred para-aramid is poly(p-phenylene terephthalamide).

Yarns used in any of the fabric layers of this invention should exhibit a tenacity of greater than 20 grams per dtex and as much as 50 grams per dtex or more; an elongation to break of at least 2.0% and as much as 6% or more; and a modulus of at least 270 grams per dtex and as much as 2000 grams per dtex or more.

A combination of the three elements of this invention is made by placing the three together, in face to face relation, with other layer materials therebetween or not, as desired. Other layer materials which may be placed among the three elements include, for example, water proofing materials, anti-trauma materials, and the like.

Improved ice pick and knife penetration resistance can be obtained using only two of the elements in accordance with this invention. A combination of the plurality of layers of woven polybenzoxazole or polybenzothiazole fibers and the plurality of tightly-woven penetration resistant layers, in accordance with the present invention, produces ice pick and knife penetration resistances which are much greater than the sum of those penetration resistances which would be exhibited by the elements taken individually.

The layers which form the sections of this composite can be joined such as by being sewn together or they can be stacked together and held, for example, in a fabric envelope. The layers which constitute each section are usually placed together and the composite can, thereby, be seen as a structure having distinct sections of layers.

The high knife penetration resistance of this invention is provided by the polybenzoxazole or polybenzothiazole fabric layers. The polybenzoxazole or polybenzothiazole fabric layers can be located anywhere in the article. The high ice pick penetration resistance of this invention is provided by the tightly woven fabric layers and, in order to realize the high ice pick penetration resistance, the tightly woven fabric layers must be situated nearer than the ballistic layers to the impact of the ice pick threat - the strike face. The high ballistic penetration resistance of this invention is provided by the ballistic layers which can be located anywhere in the article except that they cannot be situated at the strike face.

Given the above limitations on element location, it is understood that there are only three different arrangements for the elements of the composite of this invention. Namely, from the outer surface, or the strike face, in: (1) polybenzoxazole or polybenzothiazole layers, tightly woven layers, ballistic layers; (2) tightly woven layers, ballistic layers, polybenzoxazole or polybenzothiazole layers; and (3) tightly woven layers, polybenzoxazole or polybenzothiazole layers, ballistic layers.

The FIGURE shows the protective composite 10 of this invention with a section 11 of layers 12 of woven polybenzoxazole or polybenzothiazole, a section 13 of layers 14 of tightly-woven layers, and a section 15 of layers 16 of ballistic protective material. While the layers 12 and 14 can be intermixed in any sequence such that sections 11 and 13 are not distinct, it is important that layers of section 13 be nearer the strike face than layers of section 15.

TEST METHODS

Linear Density. The linear density of a yarn is determined by weighing a known length of the yarn. "dtex" is defined as the weight, in grams, of 10,000 meters of the yarn.

In actual practice, the measured dtex of a yarn sample, test conditions, and sample identification are fed into a computer before the start of a test; the computer records the load-elongation curve of the yarn as it is broken and then calculates the properties.

Tensile Properties. Yarns tested for tensile properties are, first, conditioned and, then, twisted to a twist multiplier of 1.1. The twist multiplier (TM) of a yarn is defined as:

$$TM=(turns/cm)(dtex)^{1/2}/30.3$$

The yarns to be tested are conditioned at 25° C., 55% relative humidity for a minimum of 14 hours and the tensile tests are conducted at those conditions. Tenacity (breaking tenacity), elongation to break, and modulus are determined by breaking test yarns on an Instron tester (Instron Engineering Corp., Canton, Mass.).

Tenacity, elongation, and initial modulus, as defined in ASTM D2101-1985, are determined using yarn gage lengths of 25.4 cm and an elongation rate of 50% strain/minute. The modulus is calculated from the slope of the stress-strain curve at 1% strain and is equal to the stress in grams at 1% strain (absolute) times 100, divided by the test yarn linear density.

Penetration Resistance. Knife penetration resistance is determined on a sample to be tested using a boning knife (made by Russell Harrington Cutlery, Inc., Southbridge, Mass., U.S.A.) with a single edged blade 15 cm (6 inches) long and about 2 cm (0.8 inch) wide, tapering toward the tip and having a Rockwell hardness of C-55. The tests are conducted in accordance with HPW test TP-0400.03 (Nov. 28, 1994) from H. P. White Lab., Inc. The test samples, placed on a 10% gelatin backing, are impacted with the knife, weighted to 4.55 kilograms (10 pounds) and dropped from various heights until penetration of the sample of greater than 6 mm under test conditions is accomplished. Ice pick penetration is determined using the same procedure as set out above except that the boning knife is replaced with an ice pick 18 centimeters (7 inches) long and 0.64 centimeters (0.25 inch) in shaft diameter having a Rockwell hardness of C-42. Results are reported as penetration energy (joules) by multiplying kilogram-meters, from the energy at the penetrating height, by 9.81.

Ballistics Performance. Ballistic tests of the multi-layer panels are conducted to determine the ballistic limit (V50) in accordance with MIL-STD-662e, except in the selection of projectiles are as follows: A panel to be tested is placed against a backing material of Roma Plastina No. 1 clay in a sample mount to hold the panel taut and perpendicular to the path of test projectiles. The projectiles are 9 mm full metal jacket hand-gun bullets weighing 124 grains, and are propelled from a test barrel capable of firing the projectiles at different velocities. The first firing for each panel is for a projectile velocity estimated to be the likely ballistics limit (V50). When the first firing yields a complete panel penetration, the next firing is for a projectile velocity of about 15.5 meters (50 feet) per second less in order to obtain a partial penetration of the panel. On the other hand, when the first firing yields no penetration or partial penetration, the next firing is for a velocity of about 15.2 meters (50 feet) per second more in order to obtain a complete penetration. After obtaining one partial and one complete projectile penetration, subsequent velocity increases or decreases of about 15.2 meters (50 feet) per second are used until enough firings are made to determine the ballistics limit (V50) for that panel.

The ballistics limit (V50) is calculated by finding the arithmetic mean of an equal number of at least three of the highest partial penetration impact velocities and the lowest complete penetration impact velocities, provided that there is a difference of not more than 38.1 meters (125 feet) per second between the highest and lowest individual impact velocities.

EXAMPLES

Preparation of layers.

Several different yarns were woven or made into layers of fabric or fibers and then made into composite structures on which to conduct stab resistance tests.

1. Plain weave fabric of 1560 denier (1733 dtex) polybenzoxazole yarn was made at 21×21 ends per inch (8.3×8.3 ends per centimeter) with an areal density of 0.47 pounds per square foot 2.3 kilograms per square meter). This yarn was available from Toyobo Co., Ltd. under the tradename of Zylon®.

2. Plain weave fabric of 400 denier (444 dtex) poly(p-phenylene terephthalamide) yarn was made at 31×31 ends per inch (12.2×12.2 ends per centimeter) with an areal density of 0.92 pounds per square foot (4.49 kilograms per square meter). This yarn was available from E. I. du Pont de Nemours and Company under the tradename of Kevlar®.

3. Plain weave fabric of 650 denier (722 dtex) polyethylene yarn was made at 35×35 ends per inch (13.8×13.8 ends per centimeter) with an areal density of 0.50 pounds per square foot (2.44 kilograms per square meter). This yarn was available from AlliedSignal, Inc. under the tradename of Spectra® 900.

4. Layers of unidirectional extended chain polyethylene fiber (UDECPE) crossplied in 0/90 degree orientation, sandwiched with polyethylene film, were used with an areal density of 0.51 pounds per square foot (2.49 kilograms per square meter). These layers were available, completely manufactured, from AlliedSignal, Inc. under the tradename of Spectra Shield Plus®.

Example 1

Combinations of polybenzoxazole (PBO) layers with layers of the other polymers were assembled and tested for stab resistance; and the results were compared with structures of equivalent areal density made from polybenzoxazole alone or the other polymers alone. The results are set out below:

| Construction | Penetrations Energy (joules) | Areal Density (psf) | (kgsm) |
| --- | --- | --- | --- |
| 8 layers (PBO) plain 8.3 × 8.3 | 22.6 | 0.47 | 2.30 |
| 40 layers (PPDT) plain 12 × 12.2 | 18.1 | 0.92 | 4.49 |
| 12 layers (ECPE) plain 13.8 × 13.8 | 11.3 | 0.50 | 2.44 |
| 22 layers (UDECPE) | 20.3 | 0.51 | 2.49 |
| 8 layers (PBO) (T) 40 layers (PPDT) (B) | 67.8 | 1.39 | 6.79 |
| 40 layers (PPDT) (T) 8 layers (PBO) (B) | 61.0 | 1.39 | 6.79 |
| 8 layers (PBO) (T) 12 layers (ECPE) (B) | 76.8 | 0.97 | 4.74 |
| 12 layers (ECPE) (T) 8 layers (PBO) (B) | 50.8 | 0.97 | 4.74 |
| 8 layers (PBO) (T) 22 layers (UDEDPE) (B) | 74.6 | 0.98 | 4.78 |
| 22 layers (UDECPE) (T) 8 layers (PBO) (B) | 45.0 | 0.98 | 4.78 |

(T) denotes the top or outer (knife stab) face
(B) denotes the bottom or inner face It is noted that the composite structures provide much higher penetration energy results than would be expected from a simple sum of the individual section elements of the combination. It is, also, noted that the penetration resistance is remarkably higher when the polybenzoxazole section is located on the top (exposed to the knife stab).

Example 2

An additional fabric was woven for use, in the Example, in combination with fabrics from the previous Example.

5. Plain weave fabric of 200 denier (222 dtex) poly(p-phenylene terephthalamide) yarn was made at 70×70 ends per inch (27.5×27.5 ends per centimeter) with an areal density of 0.26 pounds per square foot (1.26 kilograms per square meter). This yarn was available from E. I. du Pont de Nemours and Company under the tradename of Kevlar®.

Combinations of layers were assembled and tested for knife and ice pack penetration and, in two cases, ballistic resistance; and the results were compared with structures made from only a single component alone. The results are set out below:

| Construction | Areal Density (kg/m$^2$) | Penetration Energy (joules) | | Ballistic V$_{50}$ (m/sec) |
|---|---|---|---|---|
| | | Knife | Ice Pick | |
| 8 layers PBO plain 8.3 × 8.3 | 2.30 | 22.6 | <0.5 | — |
| 40 layers, 400d PPDT plain 12.2 × 12.2 | 4.49 | 18.1 | 0.9 | 523 |
| 10 layers, 200d PPDT plain 27.5 × 27.5 | 1.26 | 1.8 | 20.1 | — |
| 10 layers, 200d PPDT (T) 8 layers, PBO (M) 40 layers, 400d PPDT (B) | 8.05 | 68.3 | >180 | 572 |
| 8 layers, PBO (T) 10 layers, 200d PPDT (M) 40 layers, 400d PPDT (B) | 8.05 | 85.0 | 80.5 | — |
| Comparison | | | | |
| 40 layers, 400d PPDT (T) 8 layers, PBO (M) 10 layers, 200d PPDT (B) | 8.05 | 58.9 | 14.6 | — |

(T) denotes the top or stab face
(M) denotes the middle
(B) denotes the bottom or inner face It is noted that the composite structures provide much higher penetration energy results than would be expected from a simple sum of the individual elements of the combination. It is, also, noted that the penetration energy results are poor for the comparison composite wherein the tightly-woven layers are nearer the inner face than ballistic layers.

What is claimed is:

1. A protective composite structure comprising:
   a) A plurality of layers of woven fabric comprising polybenzoxazole or polybenzothiazole fibers, wherein said fibers have a linear density of 0.3 to 17 dtex,
   b) A plurality of layers of tightly woven penetration resistant fabric, wherein the fabric tightness factor is at least 0.75, and
   c) A plurality of layers of a network of fibers forming a ballistic protective fabric,
wherein the composite structure has an outer surface and an inner surface and the plurality of tightly woven penetration resistant layers is located nearer than the plurality of ballistic protective layers to the outer surface.

2. A composite according to claim 1 wherein said tightly-woven penetration resistant fabric includes polyamide fibers.

3. A composite according to claim 2 wherein said polyamide fibers are para-aramid.

4. A composite according to claim 1 wherein said tightly-woven penetration resistant fabric includes polyolefin fibers.

5. A composite according to claim 4 wherein said polyolefin fibers are polyethylene.

6. A composite according to claim 1 wherein said tightly-woven penetration resistant fabric includes polybenzoxazole or polybenzothiazole fibers.

7. A composite according to claim 1 wherein the layers of ballistic protective fabric are made from fibers exhibiting elongation to break of greater than 2.0%, a modulus of greater than 270 grams per dtex, and tenacity greater than 20 grams per dtex.

8. A composite according to claim 1 wherein said ballistic protective layers include polyamide fibers.

9. A composite according to claim 8 wherein said polyamide fibers are para-aramid.

10. A composite according to claim 1 wherein said ballistic protective layers include polyolefin fibers.

11. A composite according to claim 10 wherein said polyolefin fibers are polyethylene.

12. A composite according to claim 1 wherein said ballistic protective layers include polybenzoxazole or polybenzothiazole fiber.

13. The composite of claim 1 wherein the tightly-woven penetration resistant fabric comprises fabric woven from aramid yarn having a linear density of less than 500 dtex.

14. The composite of claim 1 wherein the fibers of polybenzoxazole or polybenzothiazole are in yarn with a linear density of 100 to 3300 dtex.

15. A knife and ice pick penetration resistant article comprising
   a) a plurality of layers of woven fabric comprising polybenzoxazole or polybenzothiazole fibers
   b) a plurality of layers of tightly-woven penetration resistant fabric.

16. The article of claim 15 wherein the plurality of tightly-woven penetration resistant fabric layers include aramid yarn having a linear density of less than 500 dtex and characterized by having the fabric woven to a fabric tightness factor of at least 0.95.

17. The article of claim 15 wherein the plurality of tightly-woven penetration resistant fabric layers include polybenzoxazole or polybenzothiazole yarn having a linear density of less than 500 dtex and characterized by having the fabric woven to a fabric tightness factor of at least 0.95.

* * * * *